United States Patent
Wu et al.

(10) Patent No.: US 8,285,314 B2
(45) Date of Patent: Oct. 9, 2012

(54) METHOD AND SYSTEM FOR CONFIRMING A SHORT MESSAGE OF AN ELECTRONIC DEVICE

(75) Inventors: Cheng-Meng Wu, Taoyuan (TW); Wen-Ching Chung, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 128 days.

(21) Appl. No.: 12/979,347

(22) Filed: Dec. 28, 2010

(65) Prior Publication Data

US 2011/0319103 A1    Dec. 29, 2011

(30) Foreign Application Priority Data

Jun. 24, 2010   (TW) ............................... 99120565 A

(51) Int. Cl.
*H04W 4/00* (2009.01)
(52) U.S. Cl. ..................... 455/466; 455/435.1; 455/411; 455/412.2; 455/422.1; 455/403; 370/328; 370/349; 370/345; 370/389; 370/496
(58) Field of Classification Search .................. 455/466, 455/435.1, 411, 412.2, 422.1, 403; 370/328, 370/349, 345, 389, 496, 522
See application file for complete search history.

(56) References Cited

U.S. PATENT DOCUMENTS

| | | | |
|---|---|---|---|
| 6,259,923 B1* | 7/2001 | Lim et al. ................. | 455/456.2 |
| 2005/0079882 A1* | 4/2005 | Lee et al. .................. | 455/466 |
| 2008/0273529 A1* | 11/2008 | Chinea et al. ............ | 370/389 |
| 2009/0061916 A1* | 3/2009 | Kim et al. ................. | 455/466 |
| 2010/0222089 A1* | 9/2010 | Russell et al. ............ | 455/466 |
| 2010/0279717 A1* | 11/2010 | Venkatachalam et al. .... | 455/466 |
| 2010/0304766 A1* | 12/2010 | Goyal ........................ | 455/466 |

* cited by examiner

*Primary Examiner* — Ajit Patel
*Assistant Examiner* — Khai M Nguyen
(74) *Attorney, Agent, or Firm* — Altis Law Group, Inc.

(57) ABSTRACT

An electronic device and a method for confirming a short message of the electronic device include setting variables to confirm the short message received by the network, enabling a timer, and assigning the variables. The confirming method includes acquiring values of the variables, and sending a DBM including the short message to the network and waiting for an acknowledge DBM, if the electronic device attempts to access the network and needs to send the short message. The confirmation method further includes queue up the DBM in the electronic device, if the electronic device does not attempt to access the network, the duration of the timer has not elapsed, and needs to send the short message.

18 Claims, 3 Drawing Sheets

METHOD AND SYSTEM FOR CONFIRMING A SHORT MESSAGE OF AN ELECTRONIC DEVICE

BACKGROUND

1. Technical Field

Embodiments of the present disclosure relate to message management, and in particular, to a method and system for confirming a short message of an electronic device.

2. Description of Related Art

If an electronic device needs to send a short message, the electronic device may send a data burst message (DBM) including the short message to a Code Division Multiple Access (CDMA) network. The electronic device may know that the DBM has delivered to the CDMA network in response to receiving an acknowledged DBM from the CDMA network. However, if the electronic device does not attempt to access to the CDMA network (e.g. page response or sending a registration message) before sending the DBM, the CDMA network would not return the acknowledged DBM to the electronic device, and the electronic device may not confirm whether the CDMA network has received the DBM.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of non-transitory computer-readable medium or other non-transitory computer storage system.

Figure 1:
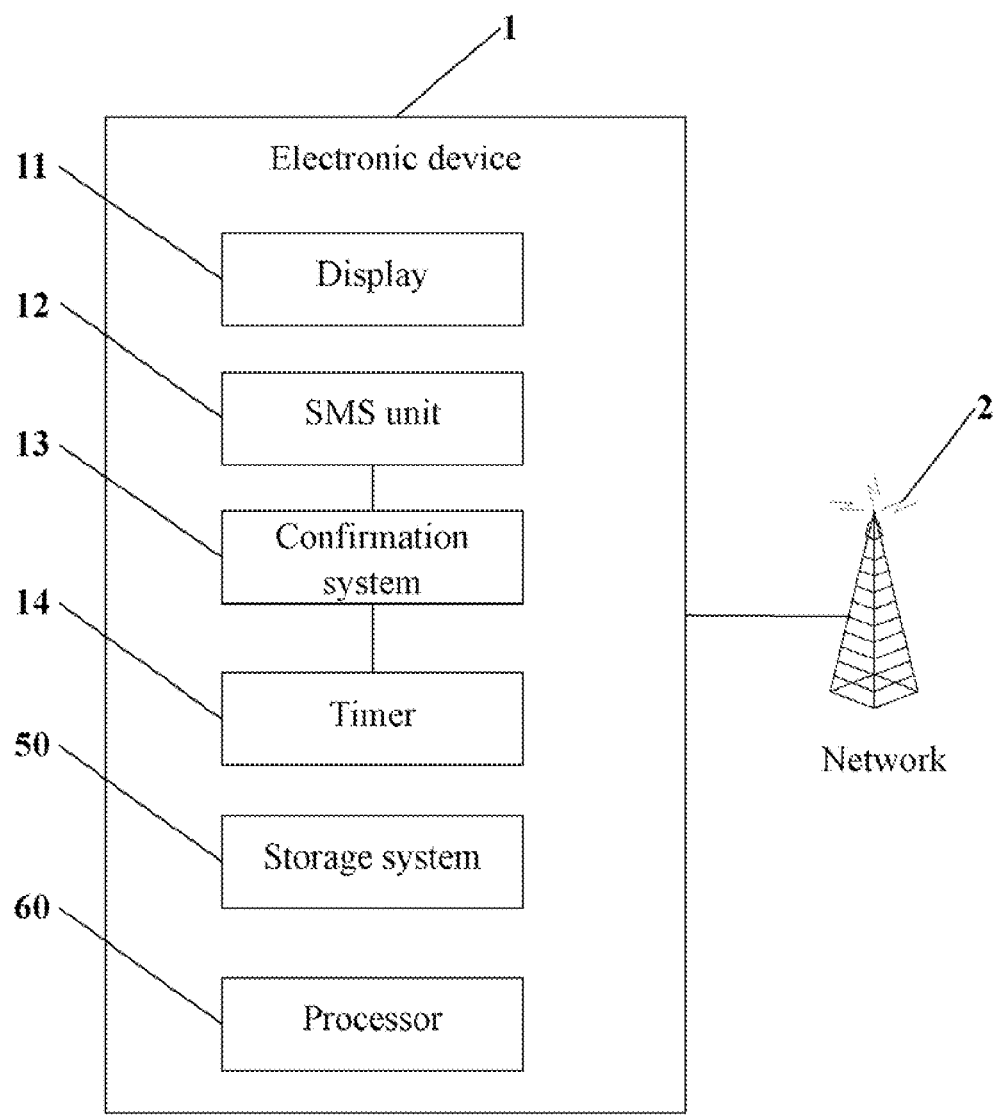
FIG. 1 is a schematic diagram of one embodiment of an electronic device including a confirmation system.

FIG. 1 is a schematic diagram of one embodiment of an electronic device 1 including a confirmation system 13. The electronic device 1 is in communication with a network 2, such as a Code Division Multiple Access network (CDMA). The confirmation system 13 may be used to ensure the electronic device 1 to receive an acknowledged data burst message (DBM) when the electronic device 1 does not attempt to access the network 2 before sending the DBM in a system access state. In some embodiments, the electronic device 1 may send a short message, or answer a call in the system access state.

The electronic device 1 also includes a short message service (SMS) unit 12 and a timer 14. The SMS unit 12 is used to edit short messages of the electronic device 1. The timer 14 may be a T57m timer. The T57m timer may be used to restrict the electronic device 1 from requesting a power-up registration of the electronic device 1. The duration of the timer 14 may be 20 seconds, for example. In some embodiments, when the SMS unit 12 needs to send a short message, the electronic device 1 may send a data burst message (DBM) including the short message to the network 2.

The electronic device 1 further includes a display 11, a storage system 50, and at least one processor 60. The display 11 may output visible data, such as a home page of the electronic device 1. The storage system 40 may be a memory system of the electronic device 1, and may be an external storage card, such as a smart media (SM) card, or secure digital (SD) card. The at least one processor 60 executes one or more computerized codes of the electronic device 1 and other applications, to provide the functions of the electronic device 1.

The electronic device 1 may send a registration message to the network 2 to request the power-up registration after the duration of the timer 14 elapses. The electronic device 1 may register to the network 2. When there is a call or a short message sent to the electronic device 1, the network 2 may notify the electronic device 1. Furthermore, before the electronic device 1 requests the power-up registration, if the electronic device 1 attempts to access the network 2, such as, attempts of dialing or answering the call, the electronic device 1 may not request the power-up registration. However, the network 2 may also determine that the electronic device 1 is in the network 2 through the attempts of accessing the network 2 of the electronic device 1.

Figure 2:
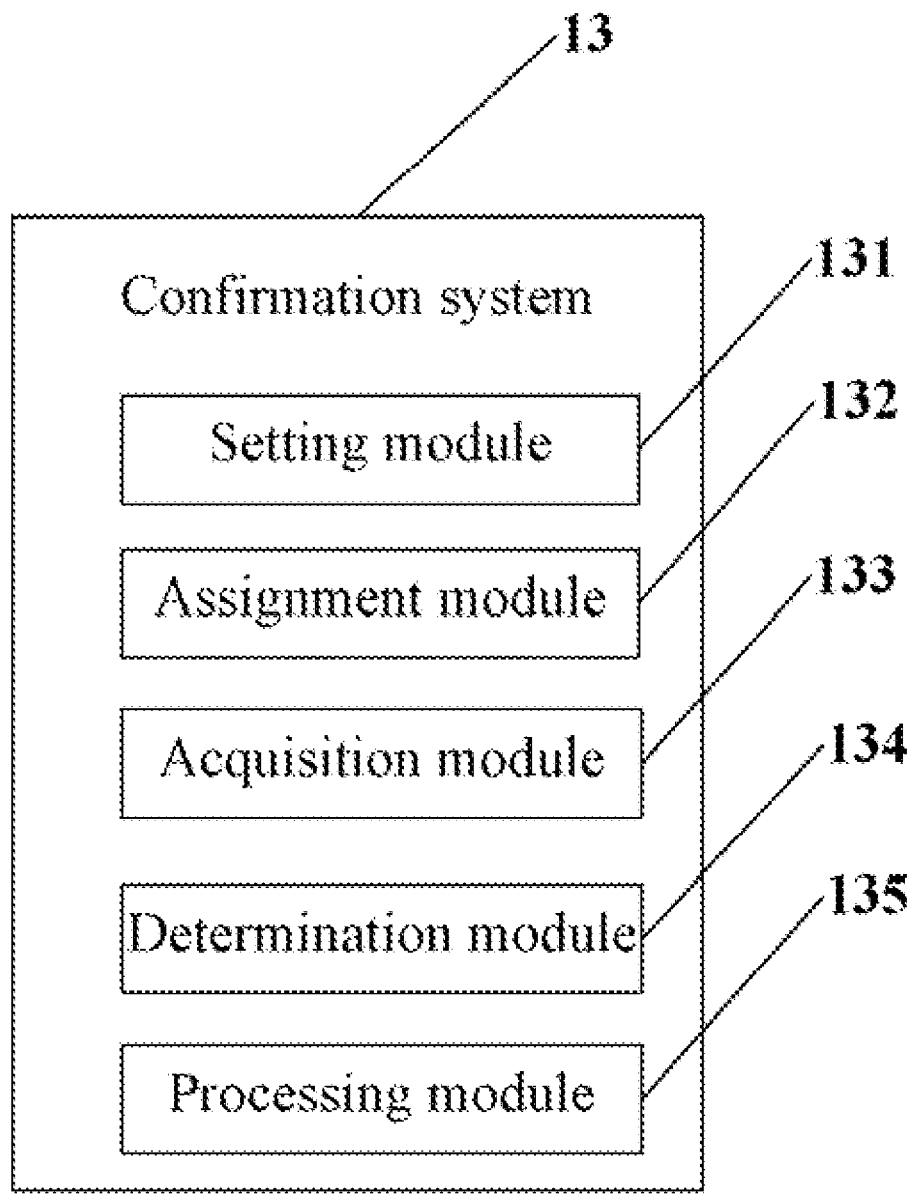
FIG. 2 is a block diagram of one embodiment of the confirmation system of FIG. 1.

FIG. 2 is a block diagram of one embodiment of the confirmation system 13 of FIG. 1. In some embodiments, the confirmation system 13 includes a setting module 131, an assignment module 132, an acquisition module 133, a determination module 134, and a processing module 135. The modules 131-135 may comprise computerized code in the form of one or more programs that are stored in the storage system 50. The computerized code includes instructions that are executed by the at least one processor 60 to provide functions for modules 131-135. Details of these operations follow.

The setting module 131 enables the timer 14 when the electronic device 1 is powered on, or disables the timer 14 when the electronic device 1 attempts to access the network 2 and the short message needs to be sent by the SMS unit 12.

The setting module 131 further sets variables to confirm the short message received by the network 2 (hereinafter referred to as "confirmation variables"). The confirmation variables include a variable "REG_STATUS", a variable "MO", a variable "MT", a variable "SEND_REG", a variable "GEN_DBM", a variable "SEND_DBM", and a variable "QUEUE_DBM". The variable "REG_STATUS" represents whether the electronic device 1 has registered to the network 2. The variable "MO" represents whether the electronic device 1 attempts to access the network 2 before sending the DBM. The variable "MT" represents whether the electronic device 1 has received a call from the network 2 before sending the DBM. The variable "SEND_REG" represents whether the electronic device 1 has sent the registration message to the network 2 before sending the DBM. The variable "GEN_DBM" represents whether the electronic device 1 has generated the DBM. The variable "SEND_DBM" represents whether the electronic device 1 may send the DBM. The variable "QUEUE_DBM" represents whether the electronic device 1 queues up the DBM in the electronic device 1, for example, the electronic device 1 stores the DBM in the storage system 50 to queue up.

In some embodiments, the confirmation variables may be Boolean types, and each of the confirmation variables may have two values including a true value and a false valve. If the values of the confirmation variables are true values, which represent that the electronic device 1 has completed the above-mentioned operations. If the values of the confirmation variables are false values, which represents that the electronic device 1 has not completed the above-mentioned operations. For example, the value of the variable "MO" is the false value, which represents that the electronic device 1 does not attempt to access the network 2 before sending the DBM. The setting module 131 further initializes values of the confirmation variables to be the false values.

The assignment module 132 assigns the true value to the variable "MO" when the electronic device 1 attempts to access the network 2 before sending the DBM. The assignment module 132 assigns the true value to the variable "MT" when the electronic device 1 has received a call from the network 2 before sending the DBM. The assignment module 132 assigns the true value to the variable "SEND_REG" when the electronic device 1 has sent the registration message to the network 2 before sending the DBM. The assignment module 132 assigns the true value to the variable "GEN_DBM" when the SMS unit 12 has finished the short message and the electronic device 1 generates the DBM. When the electronic device 1 has sent the DBM, the assignment module 132 assigns the true value to the variable "SEND_DBM". If at least one value of the variables "MO", "MT" and "SEND_REG" is the true value, the assignment module 132 may assign the true value to the variable "REG_STATUS" to represent that the electronic device 1 has registered.

The acquisition module 133 acquires the values of the confirmation variables at a predetermined interval, such as 20 seconds.

When the electronic device 1 displays the home page of the electronic device 1 on the display 11, the determination module 134 determines whether the electronic device 1 attempts to access the network 2 according to the acquired values of the confirmation variables. In some embodiments, if at least one value of the variables "MT" and "MO" is the true value, the determination module 134 determines that the electronic device 1 attempts to access the network 2. If both values of the variables "MT" and "MO" are the false values, the determination module 134 determines that the electronic device 1 does not attempt to access to the network 2.

When the values of the variables "REG_STATUS", "GEN_DBM" and "SEND_DBM" are the true values, the processing module 135 sends the DBM to the network 2 and waits for the acknowledged DBM from the network 2.

When the electronic device 1 does not attempt access to the network 2, the determination module 134 determines whether the duration of the timer 14 elapses.

If the duration of the timer 14 elapses, the processing module 135 further sends the registration message to the network 2.

If the duration of the timer 14 does not elapse, and both of the values of the variables "GEN_DBM" and "SEND_DBM" are the true values, the assignment module 132 assigns the true value to the variable "QUEUE_DBM", and the processing module 135 may store the DBM in the electronic device 1 to queue up.

The processing module 135 further receives the acknowledged DBM from the network 2.

Figure 3:
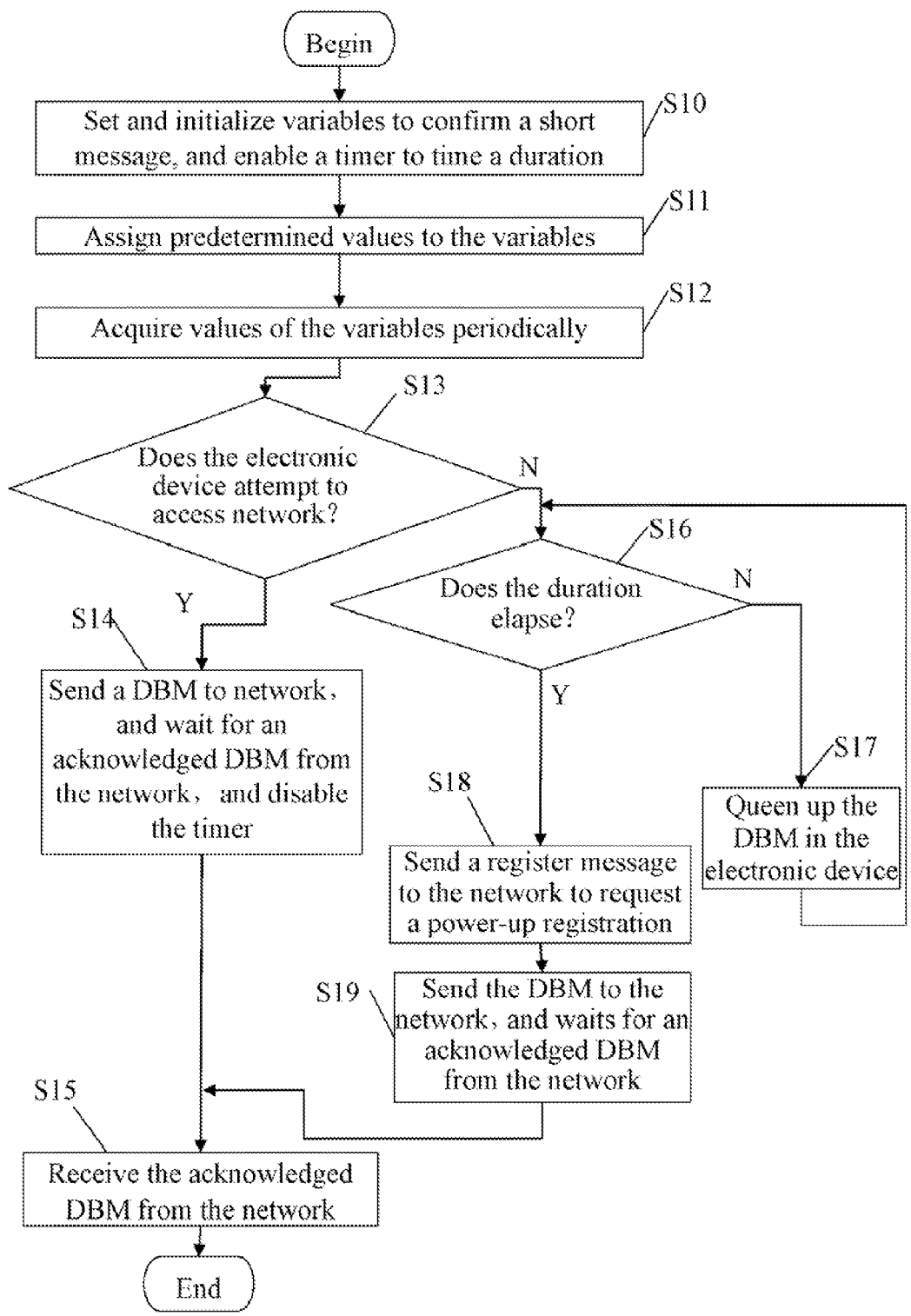
FIG. 3 is a flowchart of one embodiment of a method for confirming a short message received by a network of the electronic device of FIG. 1.

FIG. 3 is a flowchart of one embodiment of a method for confirming a short message received by a network of the electronic device of FIG. 1. Depending on the embodiment, additional blocks may be added, others removed, and the ordering of the blocks may be changed.

In block S10, when the electronic device 1 is powered on, the setting module 131 sets variables to confirming the short message received by the network 2 (confirmation variables for simplification) and enables the timer 14. The confirmation variables include a variable "REG_STATUS", a variable "MO", a variable "MT", a variable "SEND_REG", a variable "GEN_DBM", a variable "SEND_DBM", a variable "QUEUE_DBM". The values of the confirmation variables are initialized to be the false values.

In block S11, the assignment module 132 assigns the true value to the variable "MO" when the electronic device 1 attempts to access the network 2 before sending the DBM. The assignment module 132 assigns the true value to the variable "MT" when the electronic device 1 has received a call from the network 2 before sending the DBM. The assignment module 132 assigns the true value to the variable "SEND_REG" when the electronic device 1 has sent the registration message to the network 2 before sending the DBM. The assignment module 132 assigns the true value to the variable "GEN_DBM" when the SMS unit 12 has finished the short message and the electronic device 1 generates the DBM. When the electronic device 1 has sent the DBM, the assignment module 132 assigns the true value to the variable "SEND_DBM". When at least one value of the variables "MO", "MT" and "SEND_REG" is the true value, the assignment module 132 may assign the true value to the variable "REG_STATUS".

In block S12, the acquisition module 133 acquires the values of the confirmation variables regularly.

In block S13, the determination module 134 determines whether the electronic device 1 attempts to access the network 2 according to the acquired confirmation variables, when the electronic device 1 displays the home page of the electronic device 1 on the display 11. If the electronic device 1 attempts to access to the network 2, the procedure turns to block S14, and if the electronic device 1 does not attempt to access the network 2, the procedure turns to block S16.

In block S14, when both values of variables "GEN_DBM" and "SEND_DBM" are the true values, the processing module 135 sends the DBM to the network 2 and waits for the acknowledged DBM from the network 2, and the setting module 131 disables the timer 14.

In block S15, the processing module 315 receives the acknowledged DBM from the network 2, and the procedure ends.

In block S16, the determination module 134 determines whether a duration of the timer 14 elapses. If the duration of the timer 14 has not elapsed, the procedure turns to block S17. If the duration of the timer 14 elapses, the procedure turns to block S18.

In block S17, when both of the values of variables "GEN_DBM" and "SEND_DBM" are the true values, the assignment module 132 assigns the true value to the variable "QUEUE_DBM", and the processing module 135 may queue up the DBM in the electronic device 1 to queue up, and the procedure turns back to the block S16.

In block S18, the processing module 135 further sends the registration message to the network 2.

In block S19, when both values of "GEN_DBM" and "SEND_DBM" are the true values, the processing module

135 sends the DBM to the network 2 and waits for the acknowledged DBM from the network 2, and the procedure turns back to block S15.

It should be emphasized that the described exemplary embodiments are merely possible examples of implementations, and set forth for a clear understanding of the principles of the present disclosure. Many variations and modifications may be made to the-described exemplary embodiments without departing substantially from the spirit and principles of the present disclosure. All such modifications and variations are intended to be comprised herein within the scope of this disclosure and the-described inventive embodiments, and the present disclosure is protected by the following claims.

What is claimed is:

1. A computer-implemented method for confirming a short message of an electronic device, the electronic device in communication with a network, the electronic device comprising a short message service (SMS) unit and a timer, the method comprising:
    (a) setting variables to confirm the short message has been received from the network, and enabling the timer to time a duration when the electronic device is powered on;
    (b) assigning predetermined values to the variables;
    (c) acquiring the values of the variables at a predetermined interval;
    (d) determining whether the electronic device attempts to access the network according to the acquired values of the variables;
    (e) sending a data burst message (DBM) including the short message to the network and waiting for an acknowledged DBM from the network, and disabling the timer, upon the condition that the electronic device attempts to access the network and the short message needs to be sent to the network; or
    (f) queuing up the DBM in the electronic device, upon the condition that the electronic device does not attempt to access the network, the duration has not elapsed, and the short message needs to send to the network; and
    (g) receiving the acknowledged DBM from the network.

2. The method as claimed in claim 1, further comprising:
    sending a registration message to the network to request a power-on registration, and sending the DBM to the network and waiting for the acknowledged DBM from the network, under the condition that the electronic device does not attempt to access the network, the duration has elapsed, and the short message needs to send to the network.

3. The method as claimed in claim 2, wherein the step (f) further comprising:
    assigning the true value to the variable "QUEUE_DBM" to queue up the DBM in the electronic device.

4. The method as claimed in claim 2, wherein the step (b) further comprising:
    assigning a true value to the variable "MO" when the electronic device attempts to access the network before sending the DBM;
    assigning the true value to the variable "MT" when the electronic device has received a call from the network before sending the DBM.

5. The method as claimed in claim 4, wherein the electronic device is determined to attempt to access the network if at least one value of the variables "MO" and "MT" is the true value.

6. The method as claimed in claim 1, wherein the values of the variables are initialized to be a false value, and the variables comprises:
    a variable "MO," representing whether the electronic device attempts to access the network before sending the DBM;
    a variable "MT," representing whether the electronic device has received a call from the network before sending the DBM;
    a variable "QUEUE_DBM", representing whether the electronic device may queue up the DBM in the electronic device.

7. A non-transitory computer readable storage medium storing a set of instructions, the set of instructions capable of executed by a processor to perform a method for confirming a short message of an electronic device, the electronic device in communication with a network, the electronic device comprising a short message service (SMS) unit and a timer, the method comprising:
    (a) setting variables to confirm the short message received from the network, and enabling the timer to time a duration when the electronic device is powered on;
    (b) assigning predetermined values to the variables;
    (c) acquiring the values of the variables at a predetermined interval;
    (d) determining whether the electronic device attempts to access the network according to the acquired values of the variables;
    (e) sending a data burst message (DBM) including the short message to the network and waiting for an acknowledged DBM from the network, and disabling the timer, upon the condition that the electronic device attempts to access the network and the short message needs to be sent to the network; or
    (f) queuing up the DBM in the electronic device, upon the condition that the electronic device does not attempt to access the network, the duration has not elapsed, and the short message needs to send to the network; and
    (g) receiving the acknowledged DBM from the network.

8. The storage medium as claimed in claim 7, further comprising:
    sending a registration message to the network to request a power-on registration, and sending the DBM to the network and waiting for the acknowledged DBM from the network, under the condition that the electronic device does not attempt to access the network, the duration has elapsed, and the short message needs to send to the network.

9. The storage medium as claimed in claim 7, wherein the values of the variables are initialized to be a false value, and the variables comprises:
    a variable "MO," representing whether the electronic device attempts to access the network before sending the DBM;
    a variable "MT," representing whether the electronic device has received a call from the network before sending the DBM;
    a variable "QUEUE_DBM", representing whether the electronic device may queue up the DBM in the electronic device.

10. The storage medium as claimed in claim 9, wherein the step (f) further comprising:
    assigning the true value to the variable "QUEUE_DBM" to queue up the DBM in the electronic device.

11. The storage medium as claimed in claim 9, wherein the step (b) further comprising:
    assigning a true value to the variable "MO" when the electronic device attempts to access the network before sending the DBM;

assigning the true value to the variable "MT" when the electronic device has received a call from the network before sending the DBM.

12. The storage medium as claimed in claim 11, wherein the electronic device is determined to attempt to access the network if at least one value of the variables "MO" and "MT" is the true value.

13. An electronic device, comprising:
a storage system;
a timer;
a short message service (SMS) unit;
at least one processor; and
one or more programs stored in the storage system, executable by the at least one processor, the one or more programs comprising:
a setting module operable to enable the timer to time a duration when the electronic device is powered on, and disable the timer when the electronic device attempts to access the network and the short message needs to be sent to the network;
the setting module further operable to set variables to confirm the short message received by the network;
an assignment module operable to assign predetermined values to the variables;
an acquisition module operable to acquire values of the variables at a predetermined interval;
a determination module operable to determine whether the electronic device attempts to access the network according to the acquired values of the variables;
a processing module operable to send a data burst message (DBM) including the short message to the network and waiting for an acknowledged DBM from the network, upon the condition that the electronic device attempts to access the network and the short message needs to be sent the network;
the processing module further operable to queen up the DBM in the electronic device, upon the condition that the electronic device does not attempt to access the network, the duration has not elapsed, and the short message needs to send to the network; and
the processing module further operable to receive the acknowledged DBM from the network.

14. The electronic device as claimed in claim 13, wherein the processing module further operable to send a registration message to the network to request a power-on registration, under the condition that the duration has elapsed.

15. The electronic device as claimed in claim 13, wherein the values of the variables are initialized to be a false value, and the variables comprises:
a variable "MO," representing whether the electronic device attempts to access the network before sending the DBM;
a variable "MT," representing whether the electronic device has received a call from the network before sending the DBM;
a variable "QUEUE_DBM", representing whether the electronic device may queue up the DBM in the electronic device.

16. The electronic device as claimed in claim 15, wherein the assignment module operable to assign a true value to the variable "QUEUE_DBM" to queue up the DBM in the electronic device.

17. The electronic device as claimed in claim 15, wherein the assignment module further operable to assign the true value to the variable "MO" when the electronic device attempts to access the network before sending the DBM;
assigning the true value to the variable "MT" when the electronic device has received a call from the network before sending the DBM.

18. The electronic device as claimed in claim 17, wherein the electronic device is determined to attempt to access the network if at least one value of the variables "MO" and "MT" is the true value.

* * * * *